US012706263B2

(12) United States Patent
Hofsaess

(10) Patent No.: US 12,706,263 B2
(45) **Date of Patent: *Aug. 11, 2026**

(54) TEMPERATURE-DEPENDENT SWITCH

(71) Applicant: Marcel P. Hofsaess, Steintahleben (DE)

(72) Inventor: Marcel P. Hofsaess, Steintahleben (DE)

( * ) Notice: Subject to any disclaimer, the term of this patent is extended or adjusted under 35 U.S.C. 154(b) by 156 days.

This patent is subject to a terminal disclaimer.

(21) Appl. No.: 18/426,262

(22) Filed: Jan. 29, 2024

(65) Prior Publication Data

US 2024/0258052 A1 Aug. 1, 2024

(30) Foreign Application Priority Data

Jan. 31, 2023 (DE) ..................... 10 2023 102 302.0

(51) Int. Cl.
*H01H 37/54* (2006.01)

(52) U.S. Cl.
CPC ................................ *H01H 37/5427* (2013.01)

(58) Field of Classification Search
CPC ...... H01H 37/5427; H01H 1/58; H01H 37/04; H01H 37/5418; H01H 37/64
See application file for complete search history.

(56) References Cited

U.S. PATENT DOCUMENTS

| | | | | | |
|---|---|---|---|---|---|
| 4,470,033 | A * | 9/1984 | Hofsass | H01H 37/5427 | 337/365 |
| 4,672,353 | A * | 6/1987 | Ubukata | H01H 37/5418 | 337/368 |
| 5,023,744 | A * | 6/1991 | Hofsass | H02H 5/047 | 337/380 |

(Continued)

FOREIGN PATENT DOCUMENTS

| | | | |
|---|---|---|---|
| DE | 19609577 | A1 | 9/1997 |
| DE | 19748589 | A1 | 5/1999 |

(Continued)

OTHER PUBLICATIONS

Search Report issued by the European Patent Office for application 24152790.2 on Jun. 19, 2024.

*Primary Examiner* — Stephen S Sul
(74) *Attorney, Agent, or Firm* — Reising Ethington P.C.

(57) ABSTRACT

A temperature-dependent switch having a housing and a temperature-dependent switching mechanism arranged therein. The temperature-dependent switching mechanism switches, depending on its temperature, between a closed position, in which the switching mechanism establishes an electrically conductive connection between a first electrode and a second electrode, and an open position, in which the temperature-dependent switching mechanism disconnects the electrically conductive connection. The housing comprises an insulating material carrier, which carries the two electrodes and keeps them at a distance from each other along a height direction. The first electrode is electrically connected to a first external terminal. The second electrode is electrically connected to a second external terminal. The first electrode is electrically connected to the first external terminal by a connection element aligned transversely in relation to the two electrodes and arranged in the housing. The two external terminals are led through the insulating material carrier at the same height.

18 Claims, 7 Drawing Sheets

(56) References Cited

U.S. PATENT DOCUMENTS

| | | | | | |
|---|---|---|---|---|---|
| 5,607,610 | A * | 3/1997 | Furukawa | H01M 10/486 219/505 |
| 5,867,084 | A * | 2/1999 | Hofsass | H01H 37/5427 337/380 |
| 5,867,085 | A | 2/1999 | Kruck et al. | |
| 6,064,295 | A | 5/2000 | Becher et al. | |
| 6,091,316 | A | 7/2000 | Hofsaess | |
| 6,097,274 | A * | 8/2000 | Hofsass | H01H 37/5418 337/365 |
| 6,191,680 | B1 * | 2/2001 | Hofsass | H01H 37/002 337/365 |
| 6,249,210 | B1 * | 6/2001 | Hofsass | H01H 37/5418 337/365 |
| 6,300,860 | B1 * | 10/2001 | Hofsass | H01H 37/5418 337/380 |
| 6,724,293 | B1 | 4/2004 | Hofsaess | |
| 2011/0140827 | A1 * | 6/2011 | Suzuki | H01H 37/5418 337/362 |
| 2014/0104730 | A1 * | 4/2014 | Takeda | H01H 37/5418 361/26 |
| 2020/0343064 | A1 | 10/2020 | Hofsaess | |
| 2023/0142477 | A1 * | 5/2023 | Namikawa | H01H 37/52 200/400 |
| 2024/0258051 | A1 * | 8/2024 | Hofsaess | H01H 37/5418 |
| 2024/0258053 | A1 * | 8/2024 | Hofsaess | H01H 37/5418 |

FOREIGN PATENT DOCUMENTS

| | | | |
|---|---|---|---|
| DE | 19807288 | A1 | 9/1999 |
| DE | 19919648 | A1 | 12/2000 |
| DE | 102007014237 | A1 | 9/2008 |
| EP | 0858090 | A2 | 8/1998 |
| EP | 3731254 | A1 | 10/2020 |
| WO | WO2008006385 | A1 | 1/2008 |

* cited by examiner

TEMPERATURE-DEPENDENT SWITCH

CROSS-REFERENCE TO RELATED APPLICATIONS

This application claims priority from German patent application DE 10 2023 102 302.0, filed on Jan. 31, 2023. The entire content of this priority application is incorporated herein by reference.

FIELD

The present disclosure relates to a temperature-dependent switch.

BACKGROUND

An example of a temperature-dependent switch is disclosed in DE 197 48 589 A1. Another example of a temperature-dependent switch is disclosed in DE 198 07 288 A1.

Temperature-dependent switches of this type are used in a manner known per se to monitor the temperature of a device. For this purpose, the switch is brought into thermal contact with the device to be protected, for example by one of its external surfaces, so that the temperature of the device to be protected influences the temperature of the switching mechanism arranged inside the switch.

Using its external electrical connections, the switch is electrically connected in series into the supply circuit of the device to be protected by way of connecting cables, so that, below a response temperature of the switch, the supply current of the device to be protected flows through the switch.

A temperature-dependent switching mechanism installed in the switch ensures a temperature-dependent switching behaviour of the switch. This temperature-dependent switching mechanism is typically arranged between two electrodes, which in turn are electrically connected to one of the two external terminals each. The temperature-dependent switching mechanism is designed such that, below the response temperature of the switch or the response temperature of the switching mechanism, it is in a closed position, in which the switching mechanism establishes an electrically conductive connection between the two external electrical connections of the switch, and, if the response temperature of the switch is exceeded, it switches to an open position, in which the electrically conductive connection between the two external electrical connections of the switch is disconnected or interrupted.

In this way, the temperature-dependent switching mechanism ensures that, in its closed position, in which it is below the response temperature of the switch, it closes the supply circuit of the device to be protected and, in its open position, in which it is above the response temperature of the switch, it interrupts the supply circuit of the device to be protected. This means that such a temperature-dependent switch can be used to ensure that, in the event of undesired overheating, an electrical device is automatically de-energized by the switch, and thus switched off.

Such temperature-dependent switches thus provide protection against overtemperature in electrical devices of any type.

Usually responsible for the temperature-dependent switching behaviour of the switching mechanism of the switch is, in particular, a temperature-dependent switching element, which is configured to change its geometric shape depending on its temperature. This temperature-dependent switching element changes its geometric shape when the response temperature of the switch is reached and/or exceeded in such a way that it brings the switching mechanism from its closed position to its open position.

Typically, this temperature-dependent switching element is a bimetal or trimetal element, which is formed as a multi-layer, active, sheet-like component of two, three or more interconnected components with different thermal expansion coefficients. The connections between the individual layers of metals or metal alloys in such bimetal or trimetal elements are usually material-bonding or interlocking and are achieved for example by rolling.

Such a bimetal or trimetal switching element has a first stable geometric configuration (low-temperature configuration) at low temperatures, below the response temperature of the switch, which corresponds to the response temperature of this switching element, and a second stable geometric configuration (high-temperature configuration) at high temperatures, above the response temperature of the bimetal or trimetal switching element. The temperature-dependent switching element therefore switches from its low-temperature configuration to its high-temperature configuration temperature-dependently in the manner of a hysteresis.

Thus, if the temperature of the temperature-dependent switching element increases as a result of a temperature increase in the device to be protected beyond the response temperature of the switching element, it snaps from its low-temperature configuration into its high-temperature configuration and thus brings the switching mechanism from its closed position to its open position, whereby the current flow through the switch is interrupted.

If the temperature of the switch, and thus also of the temperature-dependent switching element, is subsequently reduced as a result of a cooling of the device to be protected below a so-called spring-back temperature of the switching element, the switching element changes its geometric shape from its high-temperature configuration to its low-temperature configuration, so that the switching mechanism is brought once more to its closed position, so that current can then flow through the switch again.

Typically, such temperature-dependent bimetal or trimetal switching elements are designed in such a way that their aforementioned spring-back temperature is lower than their response temperature. In principle, however, the temperature-dependent switching element may also be designed such that its spring-back temperature is in the same temperature range or even at exactly the same temperature as its response temperature.

In addition to the temperature-dependent switching element, also often used in switching mechanisms of such temperature-dependent switches is an additional spring element, which generates, or at least is involved in generating, the mechanical closing pressure of the switching mechanism in the closed position. The spring element is a temperature-independent spring element, which is preferably made of metal. This spring element acts, in particular, in the closed position of the switching mechanism to relieve the load on the switching element, since the latter then has to apply less or no force to generate the mechanical closing pressure in the closed position of the switching mechanism.

Temperature-dependent switches which, in addition to the temperature-dependent switching element, have a temperature-independent spring element in their switching mechanism can be classified into two functionally different types of designs with regard to the embodiment, arrangement and type of interaction of the switching element and the spring element.

According to a first type of design, the spring element is electrically and mechanically connected in parallel with the temperature-dependent switching element in the switch. A switch with such a type of design of the switching mechanism is known for example from the document mentioned at the beginning, DE 197 48 589 A1.

In this type of design of the switching mechanism, the spring element and the temperature-dependent switching element are usually disc-shaped and coupled with each other for movement by a movable contact part. The spring element is designed as a spring disc, which is fastened centrally to the movable contact part. The temperature-dependent switching element is usually designed as a bimetal snap disc, which is slipped over the movable contact part with a central opening. In the closed position of the switching mechanism, the spring disc presses the movable contact part against a stationary mating contact, which is arranged on a first electrode of the switch or forms a first electrode of the switch and is electrically connected to an external terminal of the switch, and is supported by its outer edge on a second electrode of the switch, which is electrically connected to a second external terminal of the switch. In this way, in the closed position of the switching mechanism, the electrical current flows between the two electrodes by way of the spring disc, which at the same time also generates the contact pressure with which the movable contact part is pressed against the stationary contact part. In the closed position of the switching mechanism, the bimetal snap disc can be mechanically mounted free from any forces and preferably also does not have current flowing through it, which has a positive effect on its service life.

According to a second type of design, the spring element is electrically and mechanically connected to the temperature-dependent switching element in the switching mechanism not in parallel but in series. A switch with such a type of design of the switching mechanism is disclosed for example in the document mentioned at the beginning, DE 198 07 288 A1. The herein presented switch is also a switch with such a switching mechanism in series connection.

In this type of design of the switching mechanism, the spring element is typically formed as an elongated spring tongue made of metal and the temperature-dependent switching element as an elongated spring tongue made of bimetal or trimetal. One end of the spring element is fastened to a first electrode electrically connected to the first external terminal of the switch. An opposite second end of the spring element is firmly connected to the temperature-dependent switching element. The free end of the temperature-dependent switching element opposite from the end of the switching element fastened to the spring element carries a movable contact part. This movable contact part interacts with a stationary contact part which is arranged on a second electrode of the switch electrically connected to the second external terminal.

In this second type of design of the switching mechanism, in the closed position of the switching mechanism the movable contact part is pressed against the stationary contact part by both the spring element and the temperature-dependent switching element. The spring element and the temperature-dependent switching element therefore jointly generate the closing pressure in the closed position of the switching mechanism due to their series connection and their fastening to each other.

Since, as mentioned, according to this type of design of the switching mechanism, they are not only mechanically but also electrically connected in series, in the closed position of the switching mechanism the current flows successively through the spring element and the temperature-dependent switching element. The latter is to be seen rather as a disadvantage compared to the aforementioned parallel type of design of the switching mechanism, because in the closed position of the switch the temperature-dependent switching element consequently has current flowing through it permanently, and is therefore subjected to greater stress.

For certain applications, however, this may also be advantageous, because the series-connected type of design of the switching mechanism leads to the temperature-dependent switching element heating up very quickly when there are high operating currents, so that such a switch reacts not only to overtemperature, but also to overcurrent. In addition, the type design with a spring element and switching element connected in series is significantly cheaper and easier to implement compared to the parallel type of design, since the switching mechanism itself and the switching mechanism housing require much simpler and smaller components. The series type of design of the switching mechanism is therefore suitable in particular for low-cost designs of temperature-dependent switches.

Regardless of the type of design of the switching mechanism, the two electrodes of the switch are typically kept at a distance from each other in the height direction. The switching mechanism is arranged in the space between the two electrodes. Since, as already mentioned, each of the two electrodes is electrically connected to one of the two external terminals of the switch each and the external terminals are typically led horizontally out of the housing of the switch, the two external terminals are usually also led out of the switch housing offset in height.

However, in order to make the electrical connection of the switch as easy as possible, it is desirable that the two external terminals lie as far as possible in a common plane. In order to ensure this, it is generally necessary in conventional switches to bend the external terminals, which are usually formed as elongated plate-shaped metal sheets, outside the switch housing in order to bring the connections into a common plane. This is cumbersome and in the worst case can also lead to damage or even breakage of the external terminals.

In addition, the sealing of the switch housing is quite cumbersome if the external terminals are led out of the switch housing offset in height at different levels from each other, since then the mechanical sealing must accordingly also take place at different levels directly at the height of the two respective electrodes, which, depending on the type of design of the switch housing, may require some additional effort to completely seal the switch interior.

However, it is desirable to seal the switch interior, in particular because the ingress of liquids or contaminants into the switch interior must be avoided in order to prevent resulting damage and/or malfunctions of the switching mechanism.

SUMMARY

It is an object to provide a temperature-dependent switch with which the aforementioned disadvantages can be overcome. In particular, an object here is to improve the electrical connectivity of the switch and at the same time further reduce the sealing problem mentioned above.

According to a first aspect, a temperature-dependent switch is presented that comprises a housing and a temperature-dependent switching mechanism arranged therein, wherein the temperature-dependent switching mechanism is configured to switch, depending on its temperature, between a closed position, in which the switching mechanism establishes an electrically conductive connection between a first electrode and a second electrode, and an open position, in which the temperature-dependent switching mechanism disconnects the electrically conductive connection between the two electrodes. The housing comprises an insulating material carrier, which forms part of the housing and carries the two electrodes and keeps them at a distance from each other along a height direction. The first electrode is electrically connected to a first external terminal. The second electrode is electrically connected to a second external terminal. The first electrode is electrically connected to the first external terminal by way of a connection element aligned transversely in relation to the two electrodes and arranged in the housing. The first and the second external terminal are led through the insulating material carrier in a common connection plane that is aligned transversely to the height direction.

The connection element which is now provided inside the housing and electrically connects the first electrode to the first external terminal internally in the switch makes it possible to lead the two external terminals through the insulating material carrier with a sealing effect not at different heights, as before, but at the same height. The sealing between the external terminals and the insulating material carrier can thus take place at the same height, which makes the general mechanical sealing of the switch interior much easier and improves it overall.

In addition, the external terminals outside the switch housing no longer have to be bent to bring them to the same height or into one and the same plane. This makes the electrical connection of the switch possible in an easy way without reworking the external terminals, as was previously necessary.

The connection element is preferably a separate component, which acts as an electrical conduction carrier between the first electrode and the first external terminal and internally in the switch is electrically connected to the first electrode on the one hand and electrically connected to the first external terminal on the other hand. For example, it may be a conduction plate which is arranged inside the housing of the switch and is arranged between the first electrode and the first external terminal.

According to a first alternative, the connection element is arranged clamped between the first electrode and the first external terminal. To improve the electrical and mechanical connection, the connection element may also be connected, e.g. welded or soldered, to the first electrode and/or the first external terminal.

According to a refinement, the first and the second external terminal run parallel alongside each other outside the insulating material carrier.

According to this refinement, the external terminals are not only arranged at the same height, but also parallel offset alongside each other. This makes the electrical connection of the switch much easier, since the two external terminals run parallel alongside each other at the same height in the manner of a plug.

According to a further refinement, a first surface portion of the first external terminal in contact with the insulating material carrier lies in the common connection plane with a first surface portion of the second external terminal in contact with the insulating material carrier.

In other words, the two surface portions of the two external terminals, that are referred to as "first surface portions", lie in a common planar plane, which in the present case is referred to as the "connection plane". The first surface portions mentioned are each surface portions of the two external terminals that are directly in contact with the insulating material carrier.

The two external terminals are thus led out of the insulating material carrier from the switch interior to the outside at the same height in the same plane. The sealing between the insulating material carrier on the one hand and the two external terminals on the other hand thus also takes place at the same height or in the same plane.

According to a further refinement, a second surface portion of the first external terminal that is adjacent to the first surface portion of the first external terminal and is arranged outside the insulating material carrier is arranged in the common connection plane. Similarly, a second surface portion of the second external terminal that is adjacent to the first surface portion of the second external terminal and is arranged outside the insulating material carrier is arranged in the common connection plane.

The two external terminals may therefore be led out of the insulating material carrier from the inside to the outside and also run further in this plane outside the insulating material carrier or outside the switch. The respective second surface portions of the two external terminals can then be electrically connected to the device to be protected in one and the same connection plane in the simplest way, e.g., by a plug connection or surface mounting.

The connection plane is preferably aligned orthogonally in relation to the height direction.

The height direction is the direction along which the two electrodes of the switch are kept at a distance from each other. The switching mechanism is arranged between the first electrode and the second electrode in the height direction.

It is in this case also preferred that the first electrode is arranged on a first side of the switching mechanism and the second electrode, the first and the second external terminal are arranged on a second side of the switching mechanism lying opposite in the height direction.

The first electrode is preferably arranged above the switching mechanism in the height direction, while the two external terminals together with the second electrode are arranged on the underside of the switching mechanism lying opposite in the height direction.

This has the advantage that the two external terminals are led of the insulating material carrier as far down as possible, near the underside of the switch housing.

According to a further refinement, at least a part of the second electrode is arranged in the connection plane and at least a part of the first electrode runs parallel to the connection plane.

On the one hand, this allows a design of the switch that is a very compact and flat in the height direction. On the other hand, the second electrode can then be integrally connected to the second external terminal, since it lies in one and the same connection plane with it. For example, one and the same metal sheet can be used as the second electrode and the second external terminal. This still keeps the number of components of the switch to a minimum and makes the installation of the second electrode or the second external terminal easier.

According to a further refinement, the second electrode is embedded in the insulating material carrier.

Preferably, the second electrode is permanently connected to the insulating material carrier. The insulating material carrier may for example be made of plastic or some other insulating material, which is at least partially moulded or cast around the second electrode. This increases the mechanical stability of the switch and also improves the mechanical sealing at the contact points between the second electrode and the insulating material carrier or between the second external terminal and the insulating material carrier.

According to a further refinement, the insulating material carrier forms a lower part of the housing, which is closed by a cover part, wherein the temperature-dependent switching mechanism inside the housing is arranged in a recess of the insulating material carrier between the first and the second electrode.

The cover part is preferably formed as an extra component which is fastened to the insulating material carrier which forms the lower part of the housing, for example by embossing an upper edge of the lower part. Despite the fact that the two external terminals of the switch are led through the insulating material carrier at the same height, the switch housing can basically be constructed the same as it was previously known, for example from DE 197 48 589 A1 or DE 189 07 288 A1.

According to a further refinement, the cover part is made of metal, wherein the cover part forms the first electrode.

According to this refinement, the cover part thus has two basic functions. On the one hand, as part of the switch housing, it serves to shield the inside of the housing, in which the switching mechanism is located, from the outside world and mechanically seal it. On the other hand, it serves at the same time as the first electrode for the temperature-dependent switching mechanism. This allows a space-saving embodiment of the switch.

According to an alternative refinement, the cover part is made of plastic, wherein the first electrode is arranged clamped between the cover part and the connection element.

In comparison with the aforementioned refinement, in which the cover part is made of metal and forms the first electrode, an extra component is therefore necessary here, forming the first electrode. On the other hand, the housing, which in addition to the lower part or the insulating material carrier comprises the cover part, may be completely made of plastic, which in particular allows low-cost production of the switch.

According to a further refinement, the cover part is surrounded along its entire circumference by the insulating material carrier.

This is accompanied by a further advantage with respect to the sealing of the switch, which is possible in particular due to the provision of the connection element. Unlike as known so far, for example in switches from DE 197 48 589 A1 or DE 198 07 288 A1, the first external terminal is no longer led out of the insulating material carrier at the same height as the first electrode. Thus, the cover part may be completely enclosed along its entire circumference by the insulating material carrier, whereby in particular the sealing between the cover part and the insulating material carrier is much improved.

According to a further refinement, the connection element is at least partially encased by an insulating material or embedded in it.

Preferably, the connection element is embedded in the insulating material carrier and completely surrounded by it. This means that the connection element is shielded and electrically insulated from the switching mechanism. At the same time, the connection element is housed in the switch interior in a space-saving manner.

According to a further refinement, the temperature-dependent switching mechanism comprises a temperature-dependent switching element, which is configured to change its geometric shape depending on its temperature in order to switch the switching mechanism between the closed position and the open position.

The temperature-dependent switching element is preferably a bimetal or trimetal component.

According to a further refinement, the temperature-dependent switching mechanism comprises a spring element, which is configured to establish the electrically conductive connection in the closed position of the switching mechanism, by being electrically conductively connected to the first electrode and generating a mechanical contact pressure, with which a movable contact part is pressed against the second electrode or against a stationary contact part arranged on the second electrode.

The provision of a spring element in addition to a temperature-dependent switching element within the switching mechanism has the advantage that the temperature-dependent switching element (e.g. the bimetal or trimetal component) is relieved electrically and mechanically. In addition, this can increase the contact pressure in the closed position of the switching mechanism, which in particular improves the resistance of the switch to mechanical shock. Depending on the design of the switching mechanism, as mentioned above, the temperature-dependent switching element and the temperature-independent spring element in the switching mechanism may be mechanically and electrically connected in series or in parallel with each other.

It goes without saying that the features mentioned above and still to be explained below can be used not only in the respectively specified combination but also in other combinations or on their own without departing from the spirit and scope of the present disclosure.

DESCRIPTION OF PREFERRED EMBODIMENTS

Figure 1:
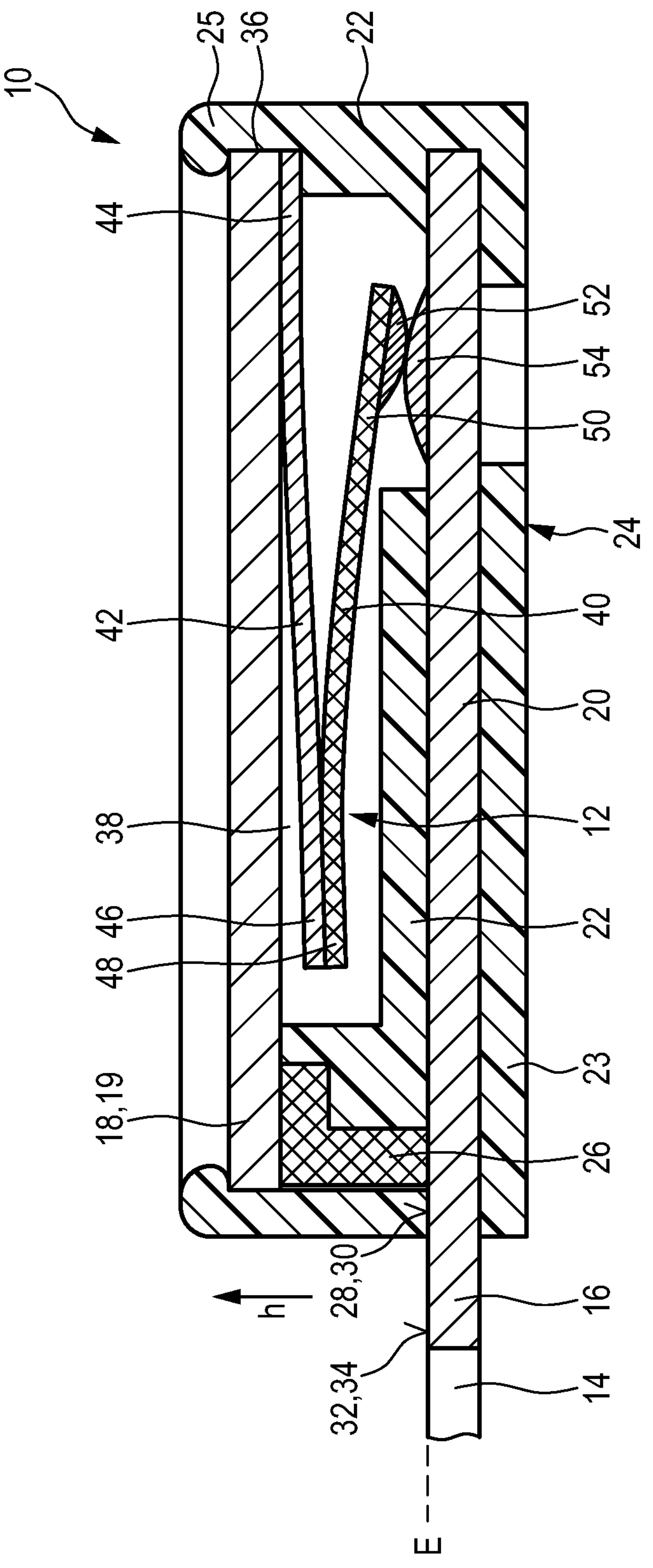
FIG. 1 shows a schematic sectional view of a first exemplary embodiment of the switch, wherein the temperature-dependent switching mechanism of the switch is in its closed position.
Figure 2:
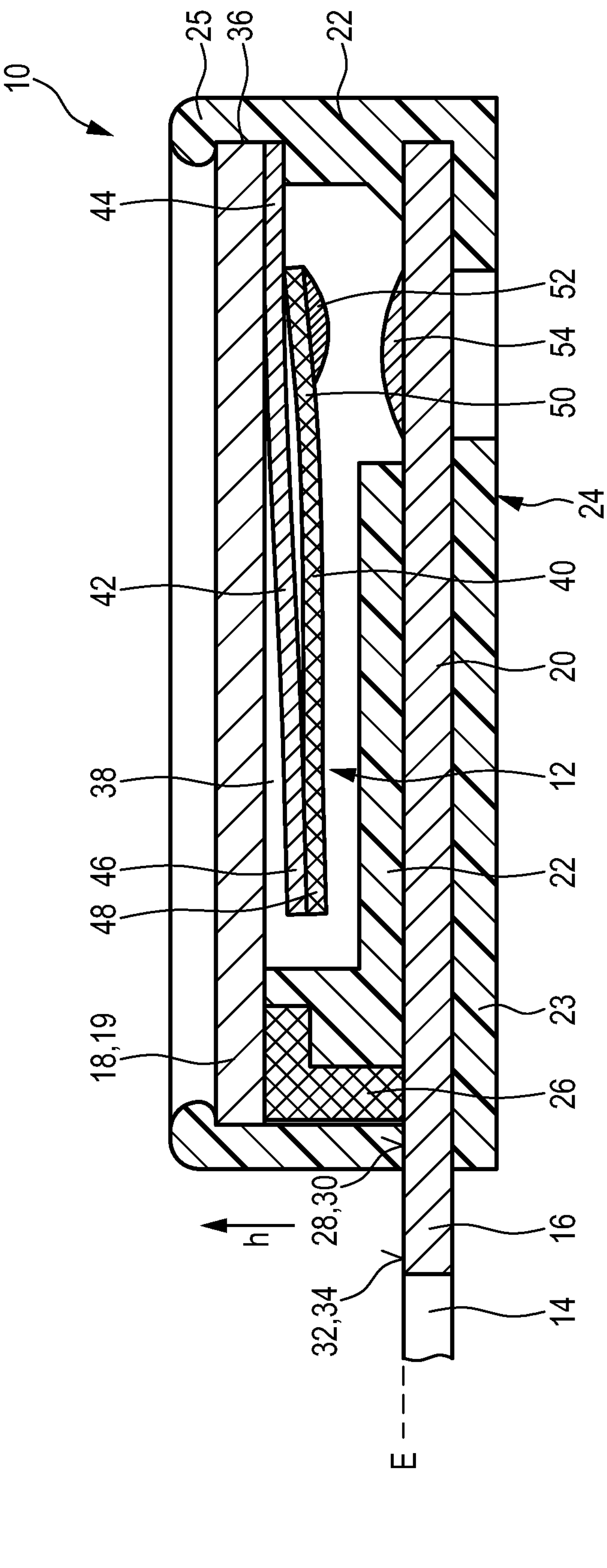
FIG. 2 shows a schematic sectional view of the exemplary embodiment of the switch shown in FIG. 1, wherein the temperature-dependent switching mechanism of the switch is in its open position.

FIGS. 1 and 2 each show a schematic sectional view of a first exemplary embodiment of the temperature-dependent switch. The switch is denoted therein in its entirety by the reference numeral 10.

FIG. 1 shows the closed position of switch 10. FIG. 2 shows the open position of switch 10.

The switch 10 comprises a temperature-dependent switching mechanism 12, which is configured to switch the switch 10, depending on its temperature, from its closed position to its open position and vice versa.

In the closed position of the switch 10 shown in FIG. 1, the switching mechanism 12 establishes an electrically conductive connection between the two external terminals 14, 16 of the switch 10. In the open position of the switch 10 shown in FIG. 2, by contrast, the switching mechanism 12 disconnects the electrically conductive connection between the first external terminal 14 and the second external terminal 16.

The first external terminal 14 is conductively connected to a first electrode 18. In the first exemplary embodiment shown in FIGS. 1 and 2, this first electrode 18 at the same time forms the cover of the switch 10. In other words, the first electrode 18 is formed by a cover part 19 made of metal.

The second external terminal 16 is electrically conductively connected to a second electrode 20. In the exemplary embodiment shown here, the second electrode 20 is connected in one piece to the second external terminal 16. In other words, one and the same metal sheet forms the second electrode 20 and the second external terminal 16.

The two electrodes 18, 20 are formed as flat planar electrodes. The switching mechanism 12 is arranged inside the switch 10 in the space between the two electrodes 18, 20.

The two electrodes 18, 20 are kept at a distance from each other by an insulating material carrier 22, which forms a part of the housing 24 of the switch 10. The insulating material carrier 22 carries the two electrodes 18, 20 and fixes them in their arrangement. The two electrodes 18, 20 are therefore immovable, electrodes.

The two electrodes 18, 20 are kept at a distance from each other along a height direction by the insulating material carrier 22. This height direction, which is indicated in FIGS. 1 and 2 by an arrow h, runs transversely, preferably orthogonally, in relation to the two electrodes 18, 20.

The first electrode 18 is arranged on an upper side (referred to here as the "first side") of the switching mechanism 12, while the second electrode 20 is arranged on the underside (referred to here as the "second side") of the switching mechanism 12 lying opposite in the height direction h.

The insulating material carrier 22 is formed essentially in a pot shape. It forms the lower part 23 of the housing 24. The insulating material carrier 22 is formed around the second electrode 20 by overmoulding or potting in such a way that the second electrode 20 is an integral component of the lower housing part 23.

The lower part 23 of the housing 24 is closed by the first electrode 18 formed as the cover part 19. The cover part 19 is surrounded all around, along its entire circumference, by the insulating material carrier 22 and is held captively on it by a hot-embossed upper edge 25 of the insulating material carrier 22 and the lower part 23.

In the insulating material carrier 22, a connection element 26 made of electrically conductive material is also integrated. This connection element 26 may be for example a conduction plate or some other electrical conductor which is integrated in the insulating material carrier 22, and thus, despite its arrangement inside the housing 24, is electrically insulated from the switching mechanism 12 also arranged inside the housing 24. In the exemplary embodiment shown here, the connection element 26 is formed L-shaped in cross section.

The connection element 26 connects the first electrode 18 to the first external terminal 14. In this way it is possible, despite the arrangement of the two electrodes 18, 20 offset in the height direction h, nevertheless to lead the two external terminals 14, 16 through the insulating material carrier 22 from the inside to the outside at the same height. The first external terminal 14 is accordingly arranged "behind" the second external terminal 16 in the sectional views shown in FIGS. 1 and 2, since the first external terminal 14 is arranged at the same height as the second external terminal 16 and runs parallel to the second external terminal 16. The latter can be seen, in particular, by joint consideration with the plan view from above shown in FIG. 3.

Figure 3:
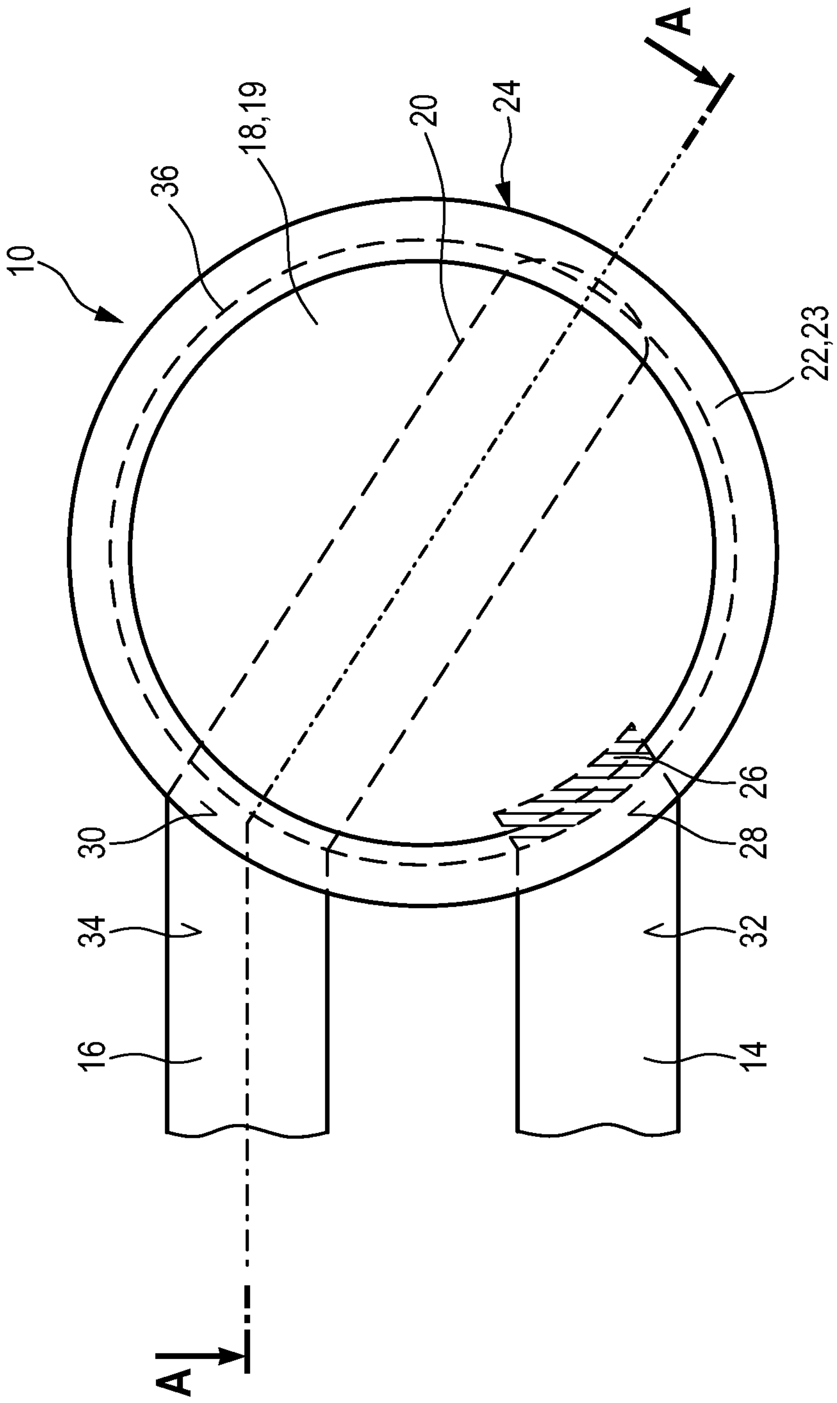
FIG. 3 shows a schematic plan view of the exemplary embodiment of the switch shown in FIG. 1.

As shown in FIG. 3, the two external terminals 14, 16 run parallel alongside each other outside the insulating material carrier 22 and, due to the connection element 26, can be arranged in a common connection plane E, which is indicated in FIGS. 1 and 2 by a dashed line.

More specifically, a first surface portion 28 of the first external terminal 14 in contact with the insulating material carrier 22 and a first surface portion 30 of the second external terminal 16 in contact with the insulating material carrier 22 is arranged in the connection plane E. The two first surface portions 28, 30 are meant to be in particular the two portions of the upper sides of the external terminals 14, 16, which are directly adjacent to the insulating material carrier 22 at the respective locations at which the two external terminals 14, 16 are led out of the insulating material carrier 22, and thus out of the switch 12, to the outside.

Since the two external terminals 14, 16 are preferably formed as flat or plate-shaped connections, the respective surface portions 32, 34 of the two external terminals 14, 16, which are arranged outside the insulating material carrier 22, also lie in the common connection plane E. The surface portion 32 of the first external terminal 14 located outside the insulating material carrier 22 is referred to in the present case as the "second surface portion" 32 of the first external terminal 14. The surface portion 34 of the second external terminal 16 located outside the insulating material carrier 22 is referred to in the present case as the "second surface portion" 34 of the second external terminal 16.

While the second electrode 20 in the first exemplary embodiment shown in FIGS. 1 and 2 is also arranged in the connection plane E, the first electrode 18 is arranged offset parallel to the connection plane E in the height direction h. The connection plane E is preferably aligned orthogonally in relation to the height direction h.

The connection element 26 also offers the advantage that, for the electrical contacting, the cover part 19 may just rest on the connection element 26, while the cover part 19 may be completely surrounded along its entire outer circumference 36 by the insulating material carrier 22, whereby the sealing of the switch interior is much improved.

The basic arrangement of the two electrodes 18, 20, the design of the housing 24 with its cover part 19 and its lower part 23 as well as the arrangement of the two external terminals 14, 16 and the connection element 26 can also be seen from FIG. 3. FIG. 3 shows a plan view from above the switch 10, wherein some components arranged inside the housing 24 (for example components 20 and 26) are indicated by dashed lines. The second electrode 20, which is indicated in FIG. 3 by dashed lines, runs obliquely or in an angled manner in relation to the second external terminal 16 but, as already mentioned, lies together with the second external terminal 16 in the connection plane E. FIGS. 1 and 2 therefore show the section along the sectional line A-A.

It goes without saying that, with such a sectional line A-A and the way in which it is arranged as shown in FIG. 3, the connection element 26 would not be formally visible in FIGS. 1 and 2, but would be concealed by parts of the insulating material carrier 22. However, the views shown in FIGS. 1 and 2 are not true to scale and detail, but schematic sectional views in which the connection element 26 is shown schematically for better explanation of its arrangement.

It should also be mentioned that the second electrode 20 does not necessarily have to run in an angled manner or obliquely in relation to the second external terminal 16, as shown in FIG. 3. The second electrode 20 may in principle also be in line with the first external terminal 16. In such a case it is preferred that the second external terminal 16 runs together with the second electrode 20 in the radial direction of the switch housing 24. If the second external terminal 16 is arranged in the middle, i.e. offset parallel downwards in the direction of the first external terminal 14 with respect to the position shown in FIG. 3, a parallel alignment of the two external terminals 14, 16 is also possible. With reference to FIG. 3, the second external terminal 16 and the second electrode 20 would then be arranged in a line parallel to the first external terminal 14 in the middle of the housing 24.

Also in the exemplary embodiments of the switch 10 shown in FIG. 4-7, a connection element 26 is used in a very similar way for the electrical connection of the first electrode 18 to the first external terminal 14 in order to be able to lead the two external terminals 14, 16 of the switch 10 out of the insulating material carrier 22 at the same height despite the height-offset arrangement of the two electrodes 18, 20 with respect to the height direction h, and thus allow an arrangement of the two external terminals 14, 16 in a common connection plane E.

This basic arrangement principle as well as the design of the switch outlined in principle in FIG. 3 are thus also implemented in the exemplary embodiments shown in FIG. 4-7. The two further exemplary embodiments shown in FIG. 4-7 differ from the first exemplary embodiment shown in FIG. 1-2 in the functional and structural type of design of the switching mechanism 12 and in some features of the housing 24 to be explained below.

In the first exemplary embodiment shown in FIGS. 1 and 2, the switching mechanism 12 comprises a temperature-dependent switching element 40, which is electrically and mechanically connected in series with a spring element 42. The temperature-dependent switching element 40 is formed in the first exemplary embodiment as a bimetal element, which has the shape of an elongated spring tongue. The spring element 42 is made of metal and is also formed as an elongated spring tongue.

A first end 44 of the spring element 42 is fastened to the first electrode 18 with a material bond. Starting from this first end 44, the spring element 42 protrudes in the manner of a cantilever into the cavity formed by the recess 38 inside the switch 10. The opposite second, free end 46 of the spring element 42 is fastened with a material bond (e.g. by soldering or welding) to a first end 48 of the temperature-dependent switching element 40. At a second end 50 opposite from the first end 48, the temperature-dependent switching element 40 carries a movable contact part 52, which interacts with a stationary contact part 54 arranged on the second electrode 20.

In the closed position of the switching mechanism 12, the movable contact part 52 is pressed by the spring element 42 and the temperature-dependent switching element 40 against the stationary contact part 54, whereby the switch 10 is closed and the electrically conductive connection between the two external terminals 14, 16 is established.

If, starting from this, the temperature of the switching element 40 increases as a result of an increased current flow through the switch 10 or as a result of an increased outside temperature, first the creeping phase of the switching element 40 begins, a phase in which its spring force operating against the force of the spring element 42 subsides. Due to the mechanical series connection of the switching element 40 with the spring element 42, this gradual decrease in the force of the switching element 40 is compensated by the spring element 42, so that the movable contact part 52 is still pressed against the stationary contact part 54.

If the temperature of the switching element 40 then increases further up to or beyond the response temperature of the switching element 40, the switching element 40 snaps into its high-temperature configuration shown in FIG. 2, whereby the switching mechanism 12 is brought into its open position and the electrically conductive connection between the two external terminals 14, 16 is interrupted.

Figure 4:
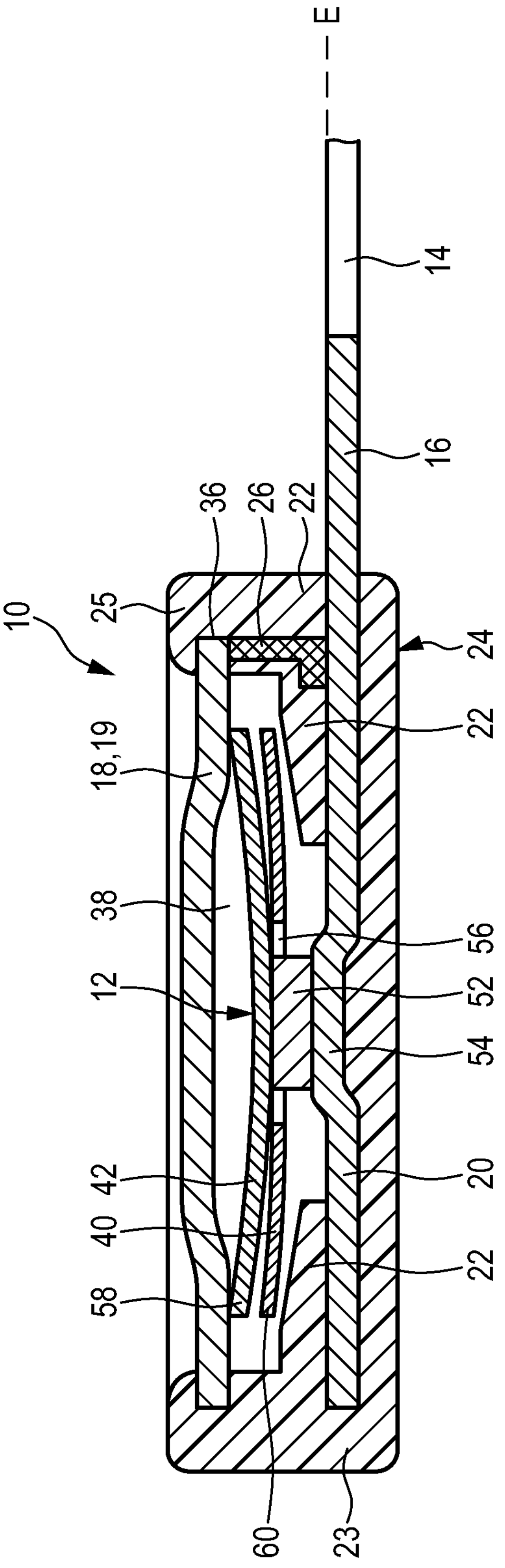
FIG. 4 shows a schematic sectional view of a second exemplary embodiment of the switch, wherein the temperature-dependent switching mechanism of the switch is in its closed position.
Figure 5:
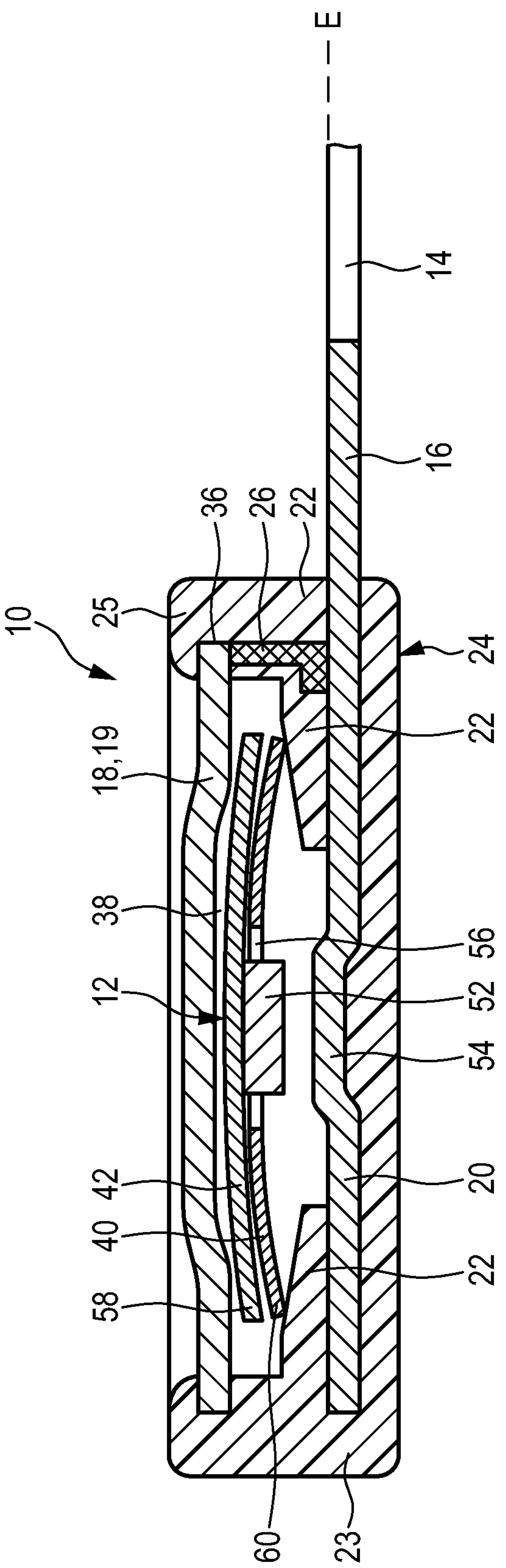
FIG. 5 shows a schematic sectional view of the exemplary embodiment of the switch shown in FIG. 4, wherein the temperature-dependent switching mechanism of the switch is in its open position.

In the second exemplary embodiment shown in FIGS. 4 and 5, the temperature-dependent switching behaviour of the switch 10 is brought about by a structurally and functionally differently designed switching mechanism 12.

The switching mechanism 12 also comprises a temperature-dependent switching element 40 and a temperature-independent spring element 42. The switching element 40 is formed here as a disc-shaped bimetal element, which is why it is also referred to as a bimetal disc. The spring element 42 is also disc-shaped and preferably formed as a spring snap disc which has two temperature-independent stable configurations, between which it snaps back and forth under the effect of force.

In the second exemplary embodiment shown in FIGS. 4 and 5, the switching element 40 and the spring element 42 are electrically and mechanically connected in parallel with each other. The movable contact part 52 is fastened to the spring element 42 with a material bond. The switching element 40 formed as a bimetallic disc is slipped over the movable contact part 52 with a hole 56 provided in its centre.

The cover part 19, which, as in the first embodiment, is preferably made of metal, acts as the first electrode 18. As before, the first electrode 18 is electrically conductively connected to the first external terminal 14 by way of the connection element 26, which is embedded in the insulating material carrier 22.

A metal sheet which is embedded in the insulating material carrier 22 and at least in certain portions lies with the external terminals 14, 16 in the connection plane E, in which the upper sides of the two external terminals 14, 16 are also arranged, acts as the second electrode 20.

Unlike in the first exemplary embodiment, the stationary contact part 54 is not formed as a separate component which is connected to the second electrode 20 with a material bond, but is formed by an elevated central portion of the second electrode 20 itself.

In the closed position of the switch 10 shown in FIG. 4, the disc-shaped spring element 42 is supported with its outer edge 58 on the inner side of the cover part 19, and thus on the first electrode 18. In this closed position of the switch 10, the temperature-dependent switching element 40 can be mounted free from any forces and protrude freely with its outer edge 60 into the recess 38 formed in the interior of the switch 10. Unlike in the first exemplary embodiment, the switching element 40 therefore does not have current flowing through it in the closed position of the switch 10.

In the closed position of the switch 10, the current flows from the first external terminal 14 by way of the connection element 26 into the first electrode 18 and from there by way of the spring element 42, the movable contact part 52, the stationary contact part 54 and the second electrode 20 to the second external terminal 16.

Likewise, in the closed position of the switch 10 shown in FIG. 4, the temperature-dependent switching element 40 does not contribute to the contact pressure with which the movable contact part 52 is pressed against the stationary contact part 54. In the design of the switching mechanism 12 shown in FIGS. 4 and 5, this closing pressure is only brought about by the spring element 42.

If the temperature of the switch 10, and thus also of the switching mechanism 12, increases to the response temperature of the switching element 40 or beyond this, the switching element 40 snaps from its convex position shown in FIG. 4 to its concave position shown in FIG. 5. In this case, the switching element 40 is supported with its outer edge 60 on the insulating material carrier 22 and, with its centre, presses the spring element 42 upwards. Thus, the spring element 42 also snaps from its concave position shown in FIG. 4 to its convex position shown in FIG. 5, whereby the movable contact part 52 is lifted off the stationary contact part 54 and the circuit is opened.

Figure 6:
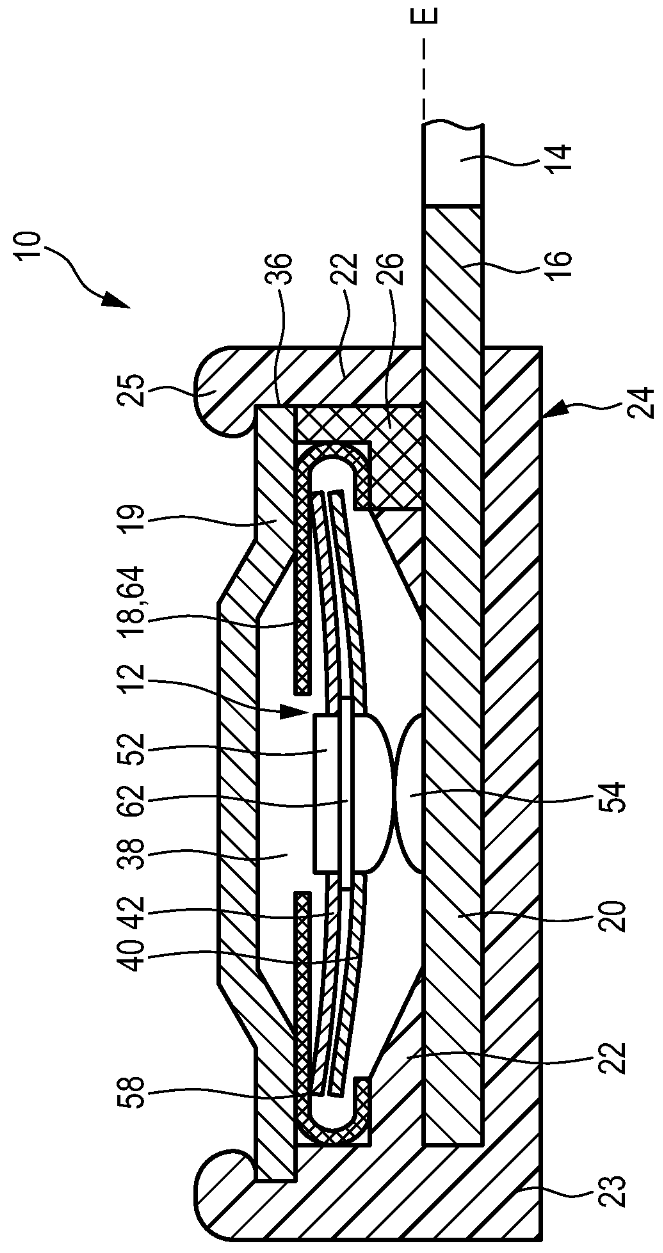
FIG. 6 shows a schematic sectional view of a third exemplary embodiment of the switch, wherein the temperature-dependent switching mechanism of the switch is in its closed position.
Figure 7:
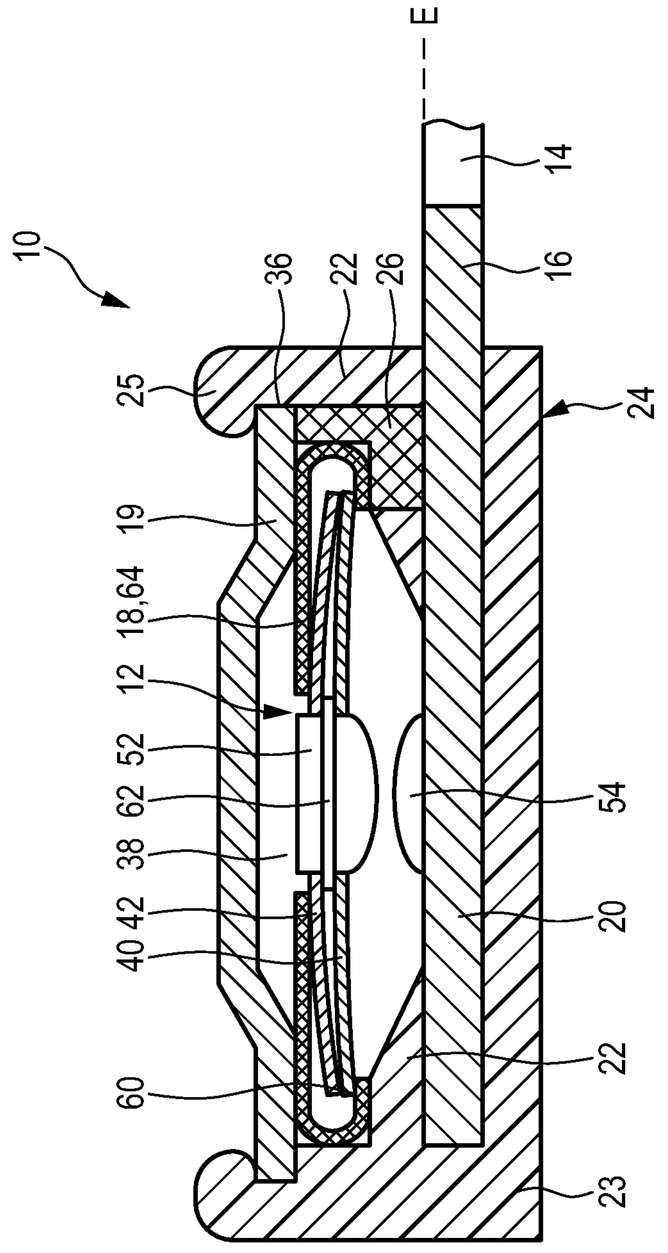
FIG. 7 shows a schematic sectional view of the exemplary embodiment of the switch shown in FIG. 6, wherein the temperature-dependent switching mechanism of the switch is in its open position.

In the exemplary embodiment of the switch 10 shown in FIGS. 6 and 7, the switching mechanism 12 is formed functionally similarly to the switching mechanism 12 according to the second exemplary embodiment shown in FIGS. 4 and 5. Here, too, the switching element 40 and the spring element 42 are mechanically and electrically connected in parallel. In addition, also in the exemplary embodiment shown in FIGS. 6 and 7, the switching element 40 and the spring element 42 are disc-shaped or circular disc-shaped and connected by their respective centre to the movable contact part 52.

However, the switching element 40 and the spring element 42 in this case lie from opposite sides against a circumferential collar 62 forming the outer edge of the movable contact part 52.

In addition to the switching element 40, the spring element 42 and the movable contact part 52, the switching mechanism 12 according to the third exemplary embodiment of the switch 10 shown in FIGS. 6 and 7 comprises a switching mechanism housing 64. This switching mechanism housing 64 is preferably made of metal. It is used to house the switching mechanism or the switching mechanism unit formed by the switching element 40, the spring element 42 and the movable contact part 52.

The switching mechanism housing 64 is formed as a partially open housing and preferably made of metal. The switching mechanism unit formed by the switching element 40, the spring element 42 and the movable contact part 52 is held captively, but with play, in the switching mechanism housing 64.

With the aid of such a switching mechanism housing 64 it is possible to pre-produce the switching mechanism 12 as a semi-finished product, to keep it as an item in stock and then to insert it as a whole into the switch housing 24.

In the closed position of the switch 10 shown in FIG. 6, the spring element 42 is supported with its outer edge 58 on the inner side of the switching mechanism housing 64 and presses the movable contact part 52 against the stationary contact part 54. Also, in this exemplary embodiment of the switching mechanism 12, in the closed position of the switch 10, the switching element 40 is mechanically mounted free from any forces and does not have current flowing through it.

In the switch 10 shown in FIGS. 6 and 7, the switching mechanism housing 64 acts as the first electrode 18. Accordingly, the cover part 19 does not have to be formed here from electrically conductive material, but may for example be made of plastic, e.g., from a similar or even the same material as the insulating material carrier 22, which forms the lower part 23 of the housing 24.

The switching mechanism housing 64 acting as the first electrode 18 lies on the connection element 26, so that here too the connection element 26 provided internally in the switch establishes the electrical contact between the first electrode 18 and the first external terminal 14 and allows attachment of the two external terminals 14, 16 at the same height or leading out of the external terminals 14, 16 from the insulating material carrier 22 at the same height.

The current flow in the closed position of the switch 10 shown in FIG. 6 takes place from the first external terminal 14 via the connection element 26, the switching mechanism housing 64 (the first electrode 18), the spring element 42, the movable contact part 52, the stationary contact part 54 and the second electrode 20 to the second external terminal 16.

In the open position of the switch 10 shown in FIG. 7, the temperature-dependent switching element 40 is supported with its outer edge 60 on the inner side of the switching mechanism housing 64 and presses the movable contact part 52 upwards, whereby the movable contact part 52 is lifted off the stationary contact part 54 and the current flow is interrupted. Thus, the spring element 42 also snaps from its concave position shown in FIG. 6 to its convex position shown in FIG. 7.

Accordingly, the three exemplary embodiments shown in the present case differ essentially in the design of the switching mechanism 12, while the principle of the attachment of the two external terminals 14, 16 in a common connection plane E is implemented in a similar manner in principle in all three exemplary embodiments by providing a connection element 26 arranged inside the switch.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A temperature-dependent switch, comprising a housing and a temperature-dependent switching mechanism arranged in the housing, wherein the temperature-dependent switching mechanism is configured to switch, depending on its temperature, between a closed position, in which the temperature-dependent switching mechanism establishes an electrically conductive connection between a first electrode and a second electrode, and an open position, in which the temperature-dependent switching mechanism disconnects the electrically conductive connection, wherein the housing comprises an insulating material carrier, which forms part of the housing and carries the first and the second electrode and keeps the first and the second electrode at a distance from each other along a height direction, wherein the first electrode is electrically connected to a first external terminal, and wherein the second electrode is electrically connected to a second external terminal, wherein the first electrode is electrically connected to the first external terminal by a connection element that is aligned transversely to the first and the second electrode and that is arranged in the housing between the first electrode and the first external terminal such that a first end of the connection element is electrically connected to the first electrode and a second end of the connection element, which is spaced apart from the first end along the height direction, is electrically connected to the first external terminal, and wherein the first external terminal and the second external terminal are led through the insulating material carrier in a common connection plane that is aligned transversely to the height direction.

2. The temperature-dependent switch according to claim 1, wherein the insulating material carrier forms a lower part of the housing which is closed by a cover part, wherein the temperature-dependent switching mechanism is arranged inside the housing in a recess of the insulating material carrier between the first and the second electrode, and wherein the cover part is along its entire circumference surrounded by the insulating material carrier.

3. The temperature-dependent switch according to claim 2, wherein the insulating material carrier has an upper edge which protrudes along an entire circumference of the insulating material carrier beyond the cover part in the height direction.

4. The temperature-dependent switch according to claim 3, wherein the upper edge of the insulating material carrier is bent onto the cover part to hold the cover part on the insulating material carrier.

5. The temperature-dependent switch according to claim 2, wherein the cover part rests on the connection element.

6. The temperature-dependent switch according to claim 2, wherein the cover part is made of metal and forms the first electrode.

7. The temperature-dependent switch according to claim 2, wherein the cover part is made of plastic and the first electrode is clamped between the cover part and the connection element.

8. The temperature-dependent switch according to claim 1, wherein the first and the second external terminals extend parallel to each other in an area outside the insulating material carrier.

9. The temperature-dependent switch according to claim 1, wherein a first surface portion of the first external terminal that is in contact with the insulating material carrier lies in the common connection plane, wherein a first surface portion of the second external terminal that is in contact with the insulating material carrier lies in the common connection plane, and wherein the first surface portion of the first external terminal and the first surface portion of the second external terminal extend parallel to each other.

10. The temperature-dependent switch according to claim 9, wherein a second surface portion of the first external terminal that is adjacent to the first surface portion of the first external terminal and that is arranged outside the insulating material carrier is arranged in the common connection plane, and wherein a second surface portion of the second external terminal that is adjacent to the first surface portion of the second external terminal and that is arranged outside the insulating material carrier is arranged in the common connection plane.

11. The temperature-dependent switch according to claim 9, wherein the common connection plane is aligned orthogonally to the height direction.

12. The temperature-dependent switch according to claim 9, wherein at least a part of the second electrode is arranged in the common connection plane, and wherein at least a part of the first electrode is arranged parallel to the common connection plane.

13. The temperature-dependent switch according to claim 1, wherein the second electrode is embedded in the insulating material carrier.

14. The temperature-dependent switch according to claim 1, wherein the connection element is at least partially encased by an insulating material or embedded in it.

15. The temperature-dependent switch according to claim 1, wherein the temperature-dependent switching mechanism comprises a temperature-dependent switching element, which is configured to change its geometric shape depending on its temperature in order to switch the temperature-dependent switching mechanism between the closed position and the open position.

16. The temperature-dependent switch according to claim 1, wherein the temperature-dependent switch comprises a spring element, which is configured to establish the electrically conductive connection in the closed position of the temperature-dependent switching mechanism, by being electrically connected to the first electrode and generating a mechanical contact pressure, with which a movable contact part is pressed against the second electrode or against a stationary contact part arranged on the second electrode.

17. The temperature-dependent switch according to claim 1, wherein the connection element comprises an electrical conductor.

18. The temperature-dependent switch according to claim 1, wherein the connection element is at least one of: (i) arranged clamped between the first electrode and the first external terminal, (ii) soldered to the first electrode and the first external terminal, or (iii) welded to the first electrode and the first external terminal.

* * * * *